United States Patent Office 2,716,661
Patented Aug. 30, 1955

2,716,661
RECOVERY AND UPGRADING OF NAPHTHENIC ACIDS

James H. McAteer, Cranford, N. J., assignor to Esso Research and Engineering Company, a corporation of Delaware No Drawing. Application September 7, 1951,
Serial No. 245,633

5 Claims. (Cl. 260—514)

This invention relates to a novel process for the recovery and upgrading of naphthenic acids.

Naphthenic acids are found in naphthenic base crude oils, particularly those obtained from California, Colombia, Venezuela, Rumania, Russia, etc. The naphthenic acids are conventionally recovered by treating the crude petroleum oil or fractions thereof with aqueous solutions of alkalies such as caustic soda to form sodium naphthenates which are soluble in the aqueous solutions. The aqueous solutions are then separated from the petroleum oil and treated with acids as sulfuric, hydrochloric, etc., to form and separate the crude naphthenic acids.

The crude naphthenic acids contain varying quantities of impurities. These impurities are generally hydrocarbons, phenolic including thiophenolic bodies and other oxygen and sulfur derivatives of petroleum. The impure acids are dark in color, and have a characteristic disagreeable odor. Distillation of the naphthenic acids improves the color but it does not eliminate the objectionable odor. It separates, moreover, only a portion of the oily non-acid impurities because the boiling range of these materials generally extends over the whole boiling range of the mixture of naphthenic acids. These oily materials, among others, comprise the so-called "unsaponifiable content," i. e., non-acidic components of naphthenic acids.

Another important criterion in evaluating naphthenic acids for commercial use is the acid number, i. e., the number of milligrams of potassium hydroxide required to neutralize on gram of the sample. The premium grades of crude acids, for example, generally have 220–230 acid numbers and maximum unsaponifiable content of 10–12 wt. per cent, whereas the inferior grades may have 170–200 acid numbers with corresponding unsaponifiable contents of about 25–15 wt. per cent. The above acid numbers are merely overall average values, since the commercially recovered naphthenic acids always comprise mixtures of a large number of individuals covering a substantial range of molecular weights and, hence, acid numbers. By its definition, acid number on a 100% acid basis decreases with increasing molecular weight.

Naphthenic acids are utilized extensively in the production of paint driers, emulsifying agents, textile and wood preservative agents and gelling agents.

For their most important fields of use, i. e., paint driers and gelling agents, it is necessary that the naphthenic acids have high acid numbers and low unsaponifiable content. Light color is also a desirable characteristic.

In many instances the crude naphthenic acids are recovered as by-products of refinery operations carried out for the principal purpose of meeting product specifications on the petroleum fraction. For this reason it is frequently true in practice that neither the boiling range of the naphthenic acid-containing fraction nor the operating variables employed in the caustic washing are selected and maintained at levels capable of yielding premium grade crude acids characterized, as above, by low unsaponifiable contents and high acid numbers on both an "as is" and 100% acid basis.

This invention provides an improved method for obtaining high grade naphthenic acids from naphthenate solutions normally yielding inferior acids. The method comprises contacting a solution of aqueous naphthenates with a solution of naphthenic acids in an organic solvent, separating the resulting mixture into an organic phase and an aqueous phase containing the upgraded naphthenates, and acidifying the aqueous phase so as to recover the upgraded naphthenic acids.

The reason for the improved quality of the naphthenic acids obtained by the process of this invention is believed to reside in the fact that the unsaponifiable or oil content normally associated with the crude acids regenerated from the naphthenate extract is thereby removed. At the same time a redistribution takes place between the naphthenate anions and free naphthenic acids whereby the anions corresponding to the weaker acids (those, generally, of lower acid number) leave the aqueous phase as free acids and are replaced by the anions of stronger acids originally present in the organic phase. Since phenolic substances, frequently present in minor amounts in crude naphthenic acids, are as a class weaker acids than the naphthenic acids, they too are removed efficiently from the naphthenate phase. It is to be understood that the theory presented is believed to be accurate, but the invention is not to be limited thereby.

The improvement in acid number and color is far in excess of that obtained by a mere extraction of the aqueous naphthenates with an organic solvent not containing free naphthenic acids.

This is especially true as regards acid number. Simple liquid-liquid extraction of aqueous naphthenates with a solvent as taught by the prior art fails to increase the acid number on a 100% basis. Similarly, the mere treatment of the aqueous naphthenates with mineral acid also does not result in the obtaining of naphthenic acids of the acid numbers obtained by the process of this invention.

It is important to note that the satisfactory operation of the redistribution process is dependent upon the absence of substantial physical solubility of water and sodium naphthenate in the organic phase and of organic solvent and naphthenic acids in the aqueous phase. It has been found that such solubility is influenced by a number of factors which will be discussed in turn.

The free caustic content of the aqueous napthenates is preferably adjusted to a low value to minimize substantial neutralization of the free acids in the organic phase. Adjustments may be made by the addition of a strong mineral acid or napthenic acids themselves in the proper amount to the naphthenate solution prior to redistribution. It is, of course, permissible to neutralize the free caustic with naphthenic acid from the organic phase, but in this case excess acids must be charged in order to maintain during redistribution the desired acid concentration in the organic phase. For most purposes, the adjustment of the naphthenate solution with a strong mineral acid is likely to be preferable. Solutions having slightly alkaline pH values of 8.5–10.5 are satisfactory. These correspond to naphthenate/free caustic ratios of 20/1 or more on an equivalent basis.

The use of naphthenate solution concentrations of approximately 1 N or greater tends to reduce the efficiency of the redistribution operation because of increased solubility of the constituents of the organic phase in the aqueous phase. It has been found that naphthenate concentrations less than 1 N and particularly those corresponding to 0.5 N or less are especially useful in minimizing solubility and in favoring the production of high acid number products from the redistributed naphthenate phase.

Naphthenic acid concentrations utilized in the organic solvent can vary over a substantial range of values. The use of increasing concentrations brings about increasing tendencies towards physical solution of the phases so that acid concentrations in excess of about 25 wt. per cent are undesirable. Excellent results are obtained when employing solutions containing about 10 wt. per cent acids.

The simultaneous use of the respective higher applicable concentrations of the naphthenate phase and of the organic phase is normally undesirable. Under these conditions reduced redistribution efficiency may be obtained because of physical solubility of the phases in each other.

The redistribution operation may be carried out over a range of temperatures with satisfactory results. Temperatures of 25° C. or higher are beneficial, however, in aiding more rapid and complete phase separation following redistribution. In practice, optimum temperatures will frequently lie in the range of 40° to 70° C. Pressures are maintained sufficiently high to assure that both phases will remain as liquids during redistribution and separation.

The ratio of naphthenic acids, charged as aqueous naphthenates, to those charged as free acid in the organic solvent is determined in a given operation by the source of the naphthenate solution and free acids and by the specifications desired for the final acid product. Thus, ratios varying from as low as 0.5/1 to as high as 10/1 may be employed with equal facility. Qualitatively, the use of lower ratios effects the ultimate production of very high unsaponifiable-free acid number products from the naphthenate phase but in lower yields based on the total naphthenates and free naphthenic acids charged. The acid product recoverable from the organic phase under these conditions will possess an acid number only moderately less than that of the free acids charged in the organic solvent. The degree of removal of unsaponifiables from the naphthenate phase is essentially unchanged by variation in the above ratio so long as the conditions yielding limited phase solubility as discussed previously are employed.

The "organic solvent" may be selected from a large group. Useful solvents are characterized by insolubility in water, chemical inertness towards naphthenic acids and high solvent power for the unsaponifiables and free naphthenic acids. Hydrocarbon solvents are particularly desirable for this purpose because they possess the above properties and are, in addition, readily available and cheap. Recovery of the solvent for re-use may be effected by extraction of the naphthenic acids or, when employing a low-boiling solvent, by distillation.

Useful solvents are: heptane, petroleum ether, halogenated hydrocarbons, kerosene, etc.

The naphthenic acids employed in the preparation of the organic phase may be selected from a variety of sources. Frequently, these acids are advantageously derived from a separate portion of the aqueous naphthenate extract to be treated. It is necessary that the naphthenic acids employed in the organic solvent contain some and preferably a substantial proportion of individual acids having acid strengths greater than those of the weaker acids in the naphthenate feed.

The exact quantity of these individual acids necessary depends on process variables such as number of stages and ratio of naphthenate/naphthenic acid.

The mineral acids that may be employed in the acidification include sulfuric and hydrochloric acid.

The redistribution operation may be carried out batchwise or continuously. In general, the number of contacting stages is small; for many purposes a single, high-efficiency stage is sufficient.

This invention will be better understood by reference to the following examples of the recovery and upgrading of naphthenic acids according to the process of this invention.

Example I

Aqueous naphthenate solutions of approximately 0.5 and 1.0 normality (pH=10.3 and 10.6 respectively) were prepared from a commercial naphthenate extract by the addition of a controlled amount of crude commercial naphthenic acids. These solutions were redistributed in a single batch operation with 10 wt. percent and 25 wt. percent solutions of the same commercial acids in a $C_6$ naphtha fraction at 30 and 50° C. The ratio of naphthenic acids charged as naphthenates to those charged in the hexane fraction was about 3.0. A small concentration of free caustic in the naphthenate solutions altered the above ratio to give a value of approximately 3.6 during redistribution. Inspections on the acid products regenerated from the redistributed naphthenate phases by means of sulfuric acid are tabulated below:

| Temp., ° C | 30 | | | | 50 | | | |
| --- | --- | --- | --- | --- | --- | --- | --- | --- |
| Naphthenate Normality | 0.5 | | 1.0 | | 0.5 | | 1.0 | |
| Naphthenate Acid in Hexane, Wt. Percent | 10 | 25 | 10 | 25 | 10 | 25 | 10 | 25 |
| Product Inspections: | | | | | | | | |
| Acid No. *195 | 234 | 224 | 226 | 198 | 234 | 227 | 222 | 207 |
| Unsaps., Wt. Percent 16.5 | 1.9 | 6.0 | 4.8 | 14.9 | 2.2 | 3.5 | 5.5 | 11.3 |
| Acid No. (100% basis) 233 | 239 | 238 | 237 | 233 | 239 | 235 | 235 | 234 |
| Color a 14 | 12 | 11 | 12 | 13 | 11 | 12 | 12 | 12 |

*Acids regenerated from naphthenate extract without prior redistribution.
a Gardner Color. Color decreases with decreasing number.

These data emphasize the dependence of product quality on changes in concentrations as discussed earlier. When the process was carried out avoiding the simultaneous use of high naphthenate and naphthenic acid concentrations it will be observed that the improvement in unsaponifiable content and acid number on a 100% basis was quite marked. Significant color improvement is also noted. These data also illustrate the improvement obtained over the mere use of a solvent as discussed above.

Example II

A naphthenate solution (0.32. N; 9.4 pH) was prepared from a commercial naphthenate extract and crude acids as in Example I. This was redistributed with a 10 wt. percent solution of naphthenic acids dissolved in a heptane fraction using varying proportions to effect variations in the naphthenate/naphthenic acid ratio. The results below were obtained from a single batch contact at room temperature.

| Charge, Naphthenates/Naphthenic Acids* | | | 2.2 | | 1.1 | | 0.45 | |
|---|---|---|---|---|---|---|---|---|
| Source of Product, Phase | (a) | (b) | Aqueous | Heptane | Aqueous | Heptane | Aqueous | Heptane |
| Product Inspections: | | | | | | | | |
| Acid No. | 212 | 195 | 240 | 118 | 230 | 152 | 254 | 167 |
| Unsaponifiables, Wt. Percent | 9.9 | 16.5 | 0.4 | 43.5 | 6.0 | | 0.0 | |
| Acid No. (100% Basis) | 234 | 233 | 241 | 209 | 245 | | 254 | |

*Weight basis. Naphthenates calculated as weight of corresponding crude acids.
a Acids regenerated from naphthenate phase without prior redistribution.
b Acids charged in heptane solution.

The influence of naphthenate/naphthenic acid ratio is readily discernible from the above data. However, as previously stated, an optimum between product quality and yield must be determined for each operation, in practice, since the use of low ratios produces low yields of upgraded acids based on the total of naphthenates and naphthenic acids in the system.

*Example III*

A simulated two-stage countercurrent redistribution operation was carried out in a series of separatory funnels using 0.3 N naphthenate and a 10 wt. percent solution of naphthenic acids in a heptane fraction. Both solutions were prepared from a commercial crude naphthenic acid mixture. The crude naphthenate solution entered stage #1; redistributed naphthenate solution was recovered from stage #2. The heptane solution passed between the stages in the opposite direction. After attainment of equilibrium, samples of the redistributed naphthenate phase (from stage #2) and heptane phase (from stage #1) were taken and their naphthenic acid contents recovered. The following results were obtained using a naphthenate/naphthenic acid feed ratio of 1.0:

| Source of Acids, Phase and Stage | Feed a | Aqueous, #2 | Heptane, #1 |
|---|---|---|---|
| Inspections: | | | |
| Acid No. | 234 | 302 | 189 |
| Unsaponifiables, Wt. Percent | 8.6 | 0.0 | 12.1 |
| Acid No. (100% basis) | 256 | 302 | 215 | a Crude acids used to prepare the naphthenate and naphthenic acid solutions.

The improvement in unsaponifiables and acid number on the acids obtained from the aqueous phase as contrasted with the control and the acids from the organic phase is self-evident.

The advantages of the process of this invention are readily apparent to those skilled in the art. Among these advantages are the obtaining of relatively oil-free acids having high acid numbers and improved color characteristics.

If desired, the naphthenic acids obtained by the process of this invention may be further purified by distillation. Acids recovered from crude commercial naphthenate solutions are in many instances not suitable for purification by distillation. Even such naphthenate solutions after treatment as taught herein can yield acids which are suitable for this purpose.

It is to be understood that the invention is not limited to the specific examples, which have been offered merely as illustrations, and that modifications may be made in equipment and conditions within the ranges specified without departing from the spirit of this invention.

What is claimed is:

1. A process for recovering and upgrading naphthenic acids, which comprises the steps of contacting a solution of aqueous naphthenates having a pH of 8.5 to 10.5 and a maximum naphthenate concentration of 1 normal with a solution of naphthenic acids in an organic solvent in the absence of added mineral acid, said naphthenic acids in the organic solvent containing a substantial proportion of individual acids having acid numbers greater than those of the weaker naphthenic acids making up the aqueous naphthenate solution; separating the resulting mixture into an organic phase containing said weaker naphthenic acids freed by the naphthenic acids of greater acid number and an aqueous phase containing the upgraded naphthenates; and acidifying the aqueous phase separated from the organic phase with a strong mineral acid after separation from the organic phase to convert the upgraded naphthenates to naphthenic acids.

2. A process as in claim 1 in which the organic solvent is a hydrocarbon solvent.

3. The process as in claim 2 in which the ratio of aqueous naphthenates expressed as naphthenic acids to the free naphthenic acids in the organic solvent is in the range of 0.5/1 to 10/1.

4. A process as in claim 3 in which the maximum naphthenic acid concentration in the hydrocarbon solvent is about 25 wt. percent.

5. A process for recovering and upgrading naphthenic acids which comprises the steps of intimately mixing an aqueous slightly alkaline solution of crude naphthenates with a solution of free naphthenic acids dissolved in a water-immiscible organic solvent therefor, the aqueous naphthenate solution having a pH of 8.5 to 10.5, a maximum naphthenate concentration of 1 normal and being employed in a ratio, expressed as naphthenic acids, to the free naphthenic acids in the organic solvent in the range of 0.5/1 to 10/1, said naphthenic acids in the organic solvent containing a substantial proportion of individual acids having acid numbers greater than those of the weaker naphthenic acids making up the aqueous naphthenate solution; continuing the mixing until the acid number of the naphthenates expressed as naphthenic acids in the water solution has been substantially increased in the absence of added mineral acid; separating the resulting mixture into an organic phase containing said weaker acids freed from the crude naphthenate by the naphthenic acids of higher acid number and an aqueous phase containing the upgraded naphthenates; and acidifying the aqueous phase with a strong mineral acid to convert the upgraded naphthenates to naphthenic acids.

References Cited in the file of this patent

UNITED STATES PATENTS

| 2,093,001 | Blount | Sept. 14, 1937 |
| 2,136,608 | Blount | Nov. 15, 1938 |
| 2,170,506 | Reiber | Aug. 22, 1939 |
| 2,537,576 | Dunlap | Jan. 9, 1951 |